(12) United States Patent
Singhal

(10) Patent No.: US 11,818,090 B2
(45) Date of Patent: Nov. 14, 2023

(54) SYSTEMS AND METHODS FOR CREATING AND SUSTAINING CAUSE-BASED SOCIAL COMMUNITIES USING WIRELESS MOBILE DEVICES AND THE GLOBAL COMPUTER NETWORK

(76) Inventor: Tara Chand Singhal, Torrance, CA (US)

( * ) Notice: Subject to any disclaimer, the term of this patent is extended or adjusted under 35 U.S.C. 154(b) by 0 days.

(21) Appl. No.: 12/932,259

(22) Filed: Feb. 22, 2011

(65) Prior Publication Data
US 2012/0173630 A1      Jul. 5, 2012

Related U.S. Application Data
(60) Provisional application No. 61/460,463, filed on Jan. 3, 2011.

(51) Int. Cl.
*H04L 51/52* (2022.01)
(52) U.S. Cl.
CPC .................................. *H04L 51/52* (2022.05)
(58) Field of Classification Search
None
See application file for complete search history.

(56) References Cited

U.S. PATENT DOCUMENTS

| | | | | |
|---|---|---|---|---|
| 7,788,260 | B2 * | 8/2010 | Lunt et al. | 707/727 |
| 7,917,381 | B1 * | 3/2011 | Ho | 705/7.12 |
| 8,010,657 | B2 * | 8/2011 | Hall et al. | 709/224 |
| 8,239,364 | B2 * | 8/2012 | Wable et al. | 707/706 |
| 2004/0215793 | A1 * | 10/2004 | Ryan et al. | 709/229 |
| 2005/0005164 | A1 * | 1/2005 | Syiek | H04L 51/28 726/4 |
| 2005/0250548 | A1 * | 11/2005 | White | 455/566 |
| 2007/0271367 | A1 * | 11/2007 | Yardeni et al. | 709/223 |
| 2007/0291134 | A1 * | 12/2007 | Hwang et al. | 348/231.2 |
| 2008/0256233 | A1 * | 10/2008 | Hall et al. | 709/224 |
| 2008/0288494 | A1 * | 11/2008 | Brogger et al. | 707/7 |
| 2008/0300980 | A1 * | 12/2008 | Benjamin et al. | 705/14 |
| 2009/0037279 | A1 * | 2/2009 | Chockalingam et al. | 705/14 |
| 2010/0205254 | A1 * | 8/2010 | Ham | 709/206 |
| 2011/0219307 | A1 * | 9/2011 | Mate et al. | 715/717 |
| 2011/0247638 | A1 * | 10/2011 | Ayala | 131/270 |

FOREIGN PATENT DOCUMENTS

WO    WO 2008069615 A1 *    6/2008    ............. G06Q 30/00

* cited by examiner

*Primary Examiner* — Philip C Lee
(74) *Attorney, Agent, or Firm* — Aldo Noto; Davidson, Berquist Jackson & Gowdey

(57) ABSTRACT

Systems and methods for creating and sustaining cause-based social communities and for creating social communities around a specific cause using mobile wireless devices and the global network of computers are described. The system has a cause-server on the global net, a cause-message originating mobile device and a ring of mobile devices. The ring has a first ring, directly reachable by original mobile, a second ring, reachable by mobile devices of first ring, and a third ring, reachable by mobile devices of the second ring of mobile devices and so on. These rings enable a cause-message to spread out in rings globally or regionally. The cause-server hosts functions that (i) enable creation of a cause-image message, (ii) distribute the cause-image to mobile devices, (iii) create a real time map of the distribution, (iv) enable display of the map updated periodically, and (v) archive the cause-message data for subsequent search/retrieval.

19 Claims, 20 Drawing Sheets

Categories of Causes 36

Save _____
Free _____
Support _____
In Memory Of _____
In Remembrance _____
Be A _____
Love _____
Fight _____
Donate funds _____
Donate Skills _____
Show _____
Find me a _____

Examples of images 37

A lighted candle
A candle being lighted by other candle
A dove
A flying dove
A soldier
A person
A teacher in action

Examples of causes 38

Save Whales from extinction

Save Koala beer

Support K-12 education

Support our teachers

In memory of Ronald Regan

In remembrance of Princess Diana

Save our plant from plastic bags

Support teacher xyz

Fight Apathy

Be an Animal Lover

Show appreciation for a good deed

Find me a good Samaritan

Love a poet

Donate skills to show by example

Donate funds to open a new learning center

Figure 7

Cause-message database 65

| ID | Cause | Part A | Part B | Part C | From & Contact |
|----|-------|--------|--------|--------|----------------|
|    |       |        |        |        |                |

Cause-message spread-map database 67

| ID | Cause | image | date | count rate | final map image | begin time | end time |
|----|-------|-------|------|------------|-----------------|------------|----------|
|    |       |       |      |            |                 |            |          |

Figure 11A

| Cause identification | cause region | originator identification | Cause location | cause size | cause category | cause status | date range |
|---|---|---|---|---|---|---|---|
| | | | | | | | |

Cause-message search database 69

Figure 11B

At step 70, enabling creating a cause-message by an originating wireless mobile device via a social-communication application operable in a cause-server, by selecting a cause-image and a cause-text for overlay on the cause-image.

At step 71, enabling posting the cause-message to the cause-server by the mobile device and receiving a server link to the cause-message from the cause-server.

At step 72, enabling spreading the cause-message from the server by the originating mobile device by sending via SMS and e-mail, a message and the server link to the contact list of the originating mobile owner.

At step 73, enabling reading the message by other mobiles and choosing to join the cause by clicking on the server link to receive the cause-message.

At step 74, sending by the receiving mobile devices similar messages to other mobiles on their own contact list, where each mobile owner receiver choosing to join the cause by clicking on the cause link and receiving the cause-message.

At step 75, receiving by the cause-server for each cause-message request from the mobile devices, the receiving mobile geographic location.

At step 76, creating a map of the mobile locations that shows the spread of the cause-message globally.

At step 77, downloading the map to others to visually show how the cause-message has spread and is spreading.

Figure 12A

At step 80, enabling creating a cause-message by a cause-originator by a social-communication application operable in a cause-server.

At step 82, enabling posting the cause-message to the cause-server

At step 84, enabling spreading the cause-message message from the server.

At step 86, enabling creating the cause-message in multiple parts of, a cause-text and a cause-image.

At step 88, enabling creating the multiple parts of the cause-message, where part A has an image, part B has a cause-text that is overlaid over part A, where part B includes identifying the cause-originator and the celebrity status of the cause-originator.

At step 90, maintaining databases in the cause-server enabling search and retrieval of the cause-messages by others;

At step 92, downloading the cause-message to mobiles and sending links to the cause-message to others by e-mail and text messages enabling the message to spread out.

At step 94, enabling creating a cause-message supporting content that is associated with the cause-message, the supporting content may include from a group of, cause-originator information, cause-support data and images, dialogue/communication with other, and link(s) to similar and supporting causes in the cause-server.

At step 96, enabling creating and maintaining a cause-message based community via the different parts of the cause-message and cause-supporting content.

Figure 12B

SYSTEMS AND METHODS FOR CREATING AND SUSTAINING CAUSE-BASED SOCIAL COMMUNITIES USING WIRELESS MOBILE DEVICES AND THE GLOBAL COMPUTER NETWORK

CROSS REFERENCE

This application claims priority from U.S. Provisional Patent Application Ser. No. 61/460,463, filed Jan. 3, 2011, titled "Systems and Method of Social Reach using Mobile Devices and Global Computer Network of Tara Chand Singhal. The contents of Application Ser. No. 61/460,463 are incorporated herein by reference.

FIELD OF THE INVENTION

Systems and methods for creating and sustaining cause-based social communities using wireless mobile devices and the global computer network enable a cause-message to spread regionally and/or globally to wireless mobile devices and enable cause-based communities to link with each other.

BACKGROUND

Wireless mobile devices, smart phones, and computers coupled with the global computer networks provide an unprecedented ability to communicate to anyone globally. These are increasingly being used for social communication and social media. Familiar examples are Facebook®, Twitter®, MySpace®, and Youtube®.

There are many other websites that cater to a variety of common interests and hobbies such as veterans, gay and lesbians, golf, music, and comparison shopping. Facebook® is used for maintaining a social circle of friends. These are used for communicating with a class of people with common interests as well as to broadcast a message as in Twitter and via a video as in Youtube®.

However, these still do not foster a sense of community and community outreach. Hence newer and different ways to use the underlying global connectivity infrastructure for creating cause-based social communities are desirable.

Hence, it is the objective of the embodiments herein to be able to create an ad-hoc social community around a specific cause. It is further the objective to provide for improved ways to create, nurture and sustain such ad-hoc social communities around a single or multiple causes, such as charitable, political, economic or social.

SUMMARY

System and methods of social communication on a global net, for creating and fostering cause-based social communities, using wireless mobile devices and the connectivity of the global computer network is described. There are different embodiments. One embodiment that uses mobile wireless devices and the global computer network is described. Another embodiment that does not depend on using mobile wireless devices is also described. Each of these embodiments can be used either separately or together. Other embodiments are not ruled out.

In one of these embodiments, the system has a social community application hosted in a cause-server on the global computer network. The application has a server part and a mobile device part. The mobile device part is downloadable to wireless mobile devices. An originating wireless mobile device, using the application, creates a cause-message. The application enables the originating mobile device with the application to create a cause-message in the mobile device and upload it to the server along with the mobile device geographic position. The cause-message has associated with it a cause-text and a cause-image, where the cause-text is positioned over a portion of the cause-image.

The cause-server stores the cause-message in the server and sends the link to the originating mobile device. The originating mobile device application part creates a text message and/or an e-mail, embeds the server link and the cause-text message, and broadcasts the message to the list of mobile device's contacts, enabling the other mobile receivers (first-ring) to receive the message.

The first ring mobile receivers read the message, choose to join/associate with the cause and click the link to load the cause-message to their own mobile devices from the cause-server along with a version of the mobile application part. The cause-server part of the application stores the first-ring mobile device locations and sends the cause-message to the respective mobile devices (the first ring mobile devices), when they load the cause-message. The version of the mobile application part broadcasts to each one's mobile contacts the cause-message, thus a second-ring, a third-ring, and so on is created enabling the cause-message to spread out.

The cause-server application stores in a cause-database, the cause-message and the locations of the spread-out of the cause-message. The application creates a geographic map displaying the spread of the message and showing the locations of the original mobile device and the locations of the first-ring and subsequent ring mobile devices that have clicked the link to receive the cause-message.

The cause-server downloads the map to anyone and displayed on a display screen (i) is the map in the middle, (ii) the cause-message on the top left of the display screen, (iii) periodically updated regional count of mobile devices who have received the cause-message, in the bottom space, (iv) and uses the other three spaces as advertising space, and updates the screen periodically with updated map and advertising spaces. The spread-out of cause-message may be displayed on the map as clusters of light points and/or as a spider chart.

The system declares a time out for the cause-message spread when the rate of spread falls below a threshold. The map displays the total count by region and the map is frozen and archived for subsequent retrieval and is searchable within the cause-database by fields of, cause identification, original mobile name identification, and a date range.

Alternatively, the cause-message may be created directly in the cause-server without the use of the mobile device and spread to others in different ways. On a web-based cause-message, additional cause-message contents are provided to create and maintain cause-based social communities globally.

These features and others as described in the description, it is believed, enable ad-hoc and long-lasting social communities to be created and sustained around a specific cause, and thus provide a convenient, fast, user friendly, and efficient way of linking people across a region, a state, or a continent using their wireless mobile devices and or computers connected to the global network.

These and other aspects of the embodiments herein are described and would become more clear with the help of the accompanying drawings and the accompanying description.

BRIEF DESCRIPTION OF THE DRAWINGS

Some of the novel features of the embodiments will be best understood from the accompanying drawings, taken in conjunction with the accompanying description, in which similar reference characters refer to similar parts, and in which:

FIG. 7 is a block diagram that illustrates features of the present embodiment of categories of cause, examples of causes and examples of the cause-images.

FIGS. 11A and 11B are block diagrams that illustrates features of the present embodiment of the databases used in the social community application functions.

FIGS. 12A and 12B are method diagrams that illustrate features of the present embodiments.

DESCRIPTION

Figure 1:
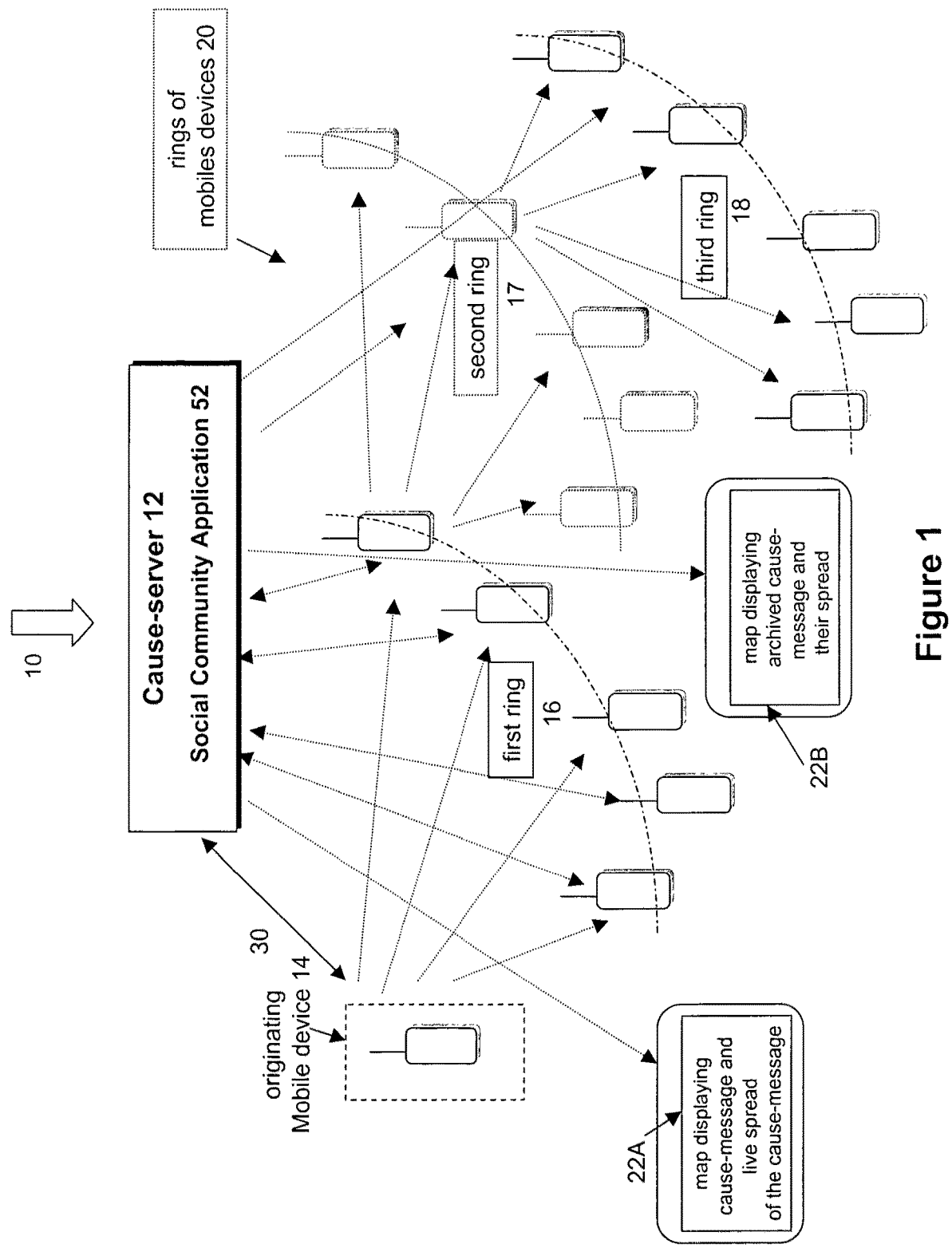
FIG. 1 is a block diagram that illustrates features of the present embodiments of a cause-server and cause-based social community application using wireless mobile devices, for creating and spreading a cause-message.

Introduction:

With reference to FIG. 1, in a preferred embodiment, a system 10 provides for a cause-based social community application 52 in a cause-server 12 on a global computer network for creating social communities around a cause.

In this embodiment, the system 10 has a cause-server 12 on the global net and a cause-message originating mobile device 14. There are also rings of mobile devices 20 of other mobile device owners that are reachable directly and indirectly by the cause-originating mobile device 14. The rings 20 has a first-ring 16, directly reachable by original mobile device 14, a second-ring 17, reachable by the mobile devices of the first-ring, and a third-ring 18, reachable by the mobile devices of the second-ring of mobile devices. These rings of mobile devices 20 enable a cause-message 31, as described later with the help of FIG. 2, to spread-out regionally or globally, based on where these mobile devices are at the time the cause-message is spread out.

As also illustrated in FIG. 1, the spread of the cause-message 31 may be displayed on maps 22A and 22B that may be downloaded by anyone from the cause-server 12. The map 22A may display a live spread out of the cause-message 31 as it is spreading across a region or the globe and a map 22B may display an archived message and how it has spread across the globe or a region.

Figure 2:
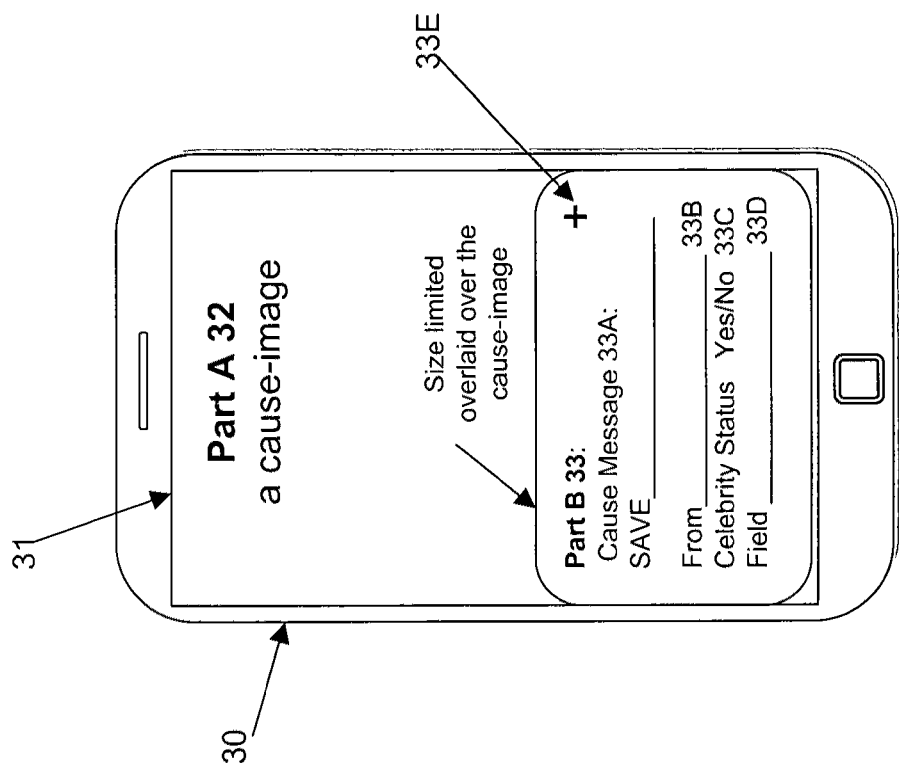
FIG. 2 is a block diagram that illustrates features of the present embodiment for a cause-message.

As illustrated in FIG. 2, the cause-message 31 displayed in a handheld mobile device 30 has two parts, part A 32 and part B 33. The cause-message 31 has a part A 32 that provides for a cause-image and a part B 33, that provides for a cause-message-text. The cause-image part 32 is sized to fit the screens of handheld wireless mobile devices 30. The cause-text part 33 is sized to fit on a portion of the cause-image 32. The cause-image 32 may be a single image or sequence of images. The cause-text 33 has a cause-message text 33A, that identifies the cause, the cause-originator for identifying who the cause-message is from 33B, the celebrity status of the cause-message originator 33C and the field of the celebrity 33D.

As a simplified illustration, as illustrated later with reference to FIG. 5A and FIG. 6A, the cause-message 31 may be lighting a candle in memory of Princess Diana, with Prince Williams as the cause-message originator. A display on a large screen connected to the cause-server in a location, where people may be gathered, would show a geographic map, showing where the message has spread and continues to spread live along with an updated count of the people who have joined in lighting a candle in memory of Princess Diana.

These systems and method would have created either ad-hoc or lasting social communities around specific causes. Any news coverage of such an event would show electronic lighting of a candle when people hold up their mobile devices with the cause-message, along with the spreading out of the cause-message on a global map, live as it is happening. That creates a powerful visual for fostering a social community around a specific cause.

Cause-Message 31

As illustrated in FIG. 2, the cause-message 31 has two parts, part A 32 and part B 33. The cause-message 31 has a part A 32 that provides for a cause-image and a part B 33, that provides for a cause-message-text, where the cause-text is positioned over a portion of the cause-image 32. The cause-image 32 may be a single image or a sequence of images. The cause-text 33 has a cause-message text 33A, who the message is from 33B, the celebrity status of the message originator 33C and the field of the celebrity 33D.

In one embodiment, a mobile wireless device 30 is preferred because these mobile devices in the form-factor of portable handheld device such as smart phones are increasingly being carried by the masses in their personal possession and they enable a global connectivity to the global computer network known as Internet. These devices also have large screens equal in size to small photographs and large processing and storage capacities to function as portable computing devices with the ability to display color images, documents, text and videos. The objectives of this embodiment may also be met by other computing devices whether fixed or portable like the laptop which also have global connectivity.

Figure 3A:
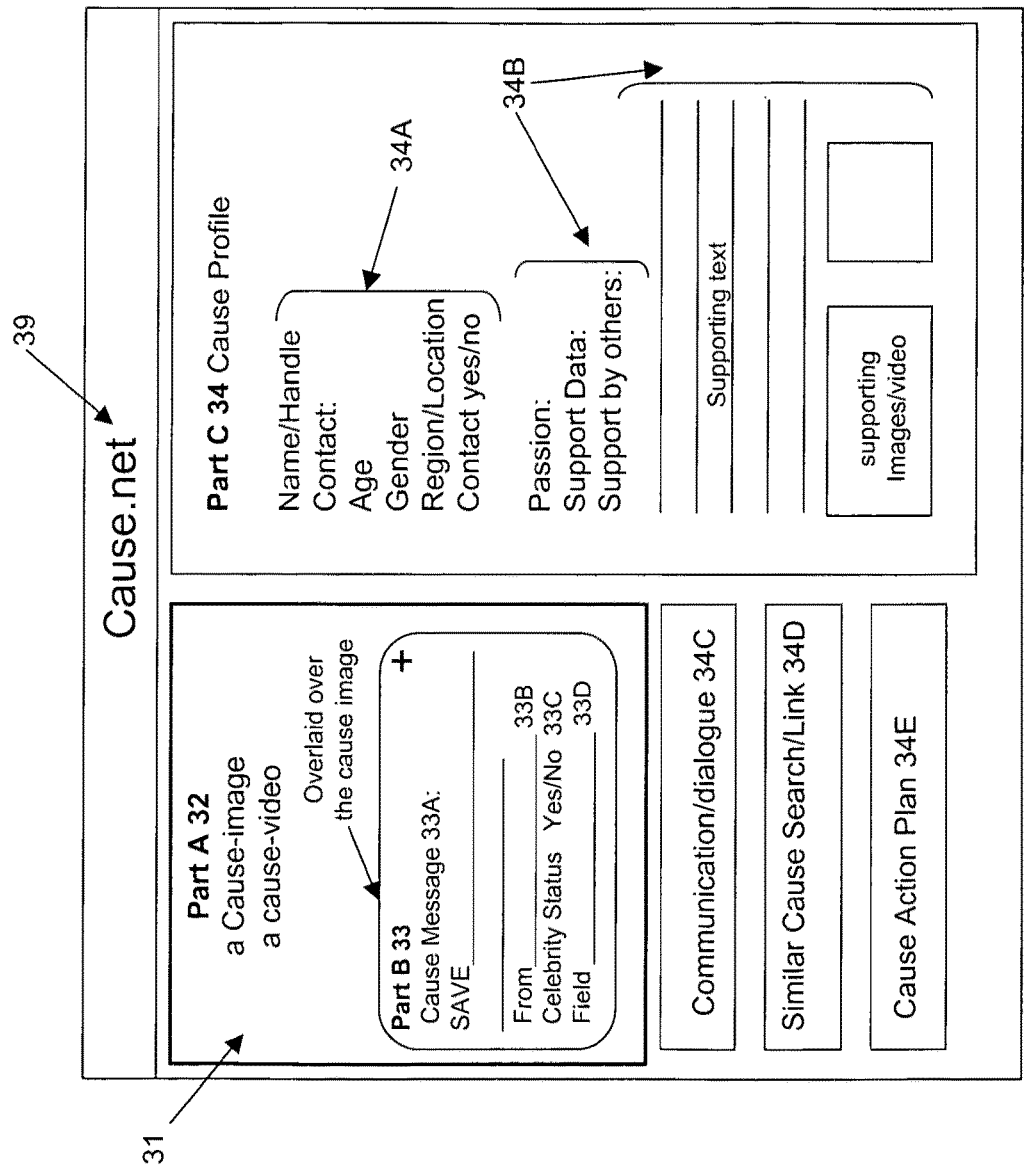
FIGS. 3A-3B are block diagrams that illustrates features of the present embodiment of different part of a cause-message.

As illustrated in FIG. 2, in addition, the cause-message 31 may also have a link icon 33E, which when activated displays the optional parts of the cause-message 31 on a website 39 from the cause-server 12, as illustrated with the help of FIG. 3A. As illustrated in FIG. 3A, the cause-message 31 may also be accessed on the cause-server 12 with a link such as, www.cause.net 39.

As illustrated in FIG. 3A, optionally, the cause-message 31 may have associated with it, a part C, identified as a cause profile 34. The cause profile 34 may have a cause-profiler personal data 34A, other data that support the cause in the form of text and images 34B.

Yet further, optionally, the cause profile 34 also provides for a communication dialogue link 34C that supports communication with like minded people. Yet further optionally the cause profile 34 may also have a link 34D that provides for searching and linking to other related causes in the cause-server 12. Yet further, optionally, there may be a cause action plan link 34E that would identify an action plan in support of furthering the cause identified by the cause-message 31.

As also illustrated with the help of FIG. 3A, the application 52 additionally enables creation of cause-message supporting content 34 that is associated with the cause-message 31, the supporting content 34 may include from a group of, cause-originator information 34A, cause-support data and images 34B, dialogue and communication with others 34C, and link(s) to similar and supporting causes 34D in the cause-server.

The supporting links under link 34D may be visually organized and grouped based on geography, leadership, and hierarchy, making it easier for the public at large and the cause-community members to know and see a complete picture of the off-shoots of a cause. In some aspects, this is analogous to having chapters in different geographic regions of a cause-based central organizing entity.

Figure 3B:
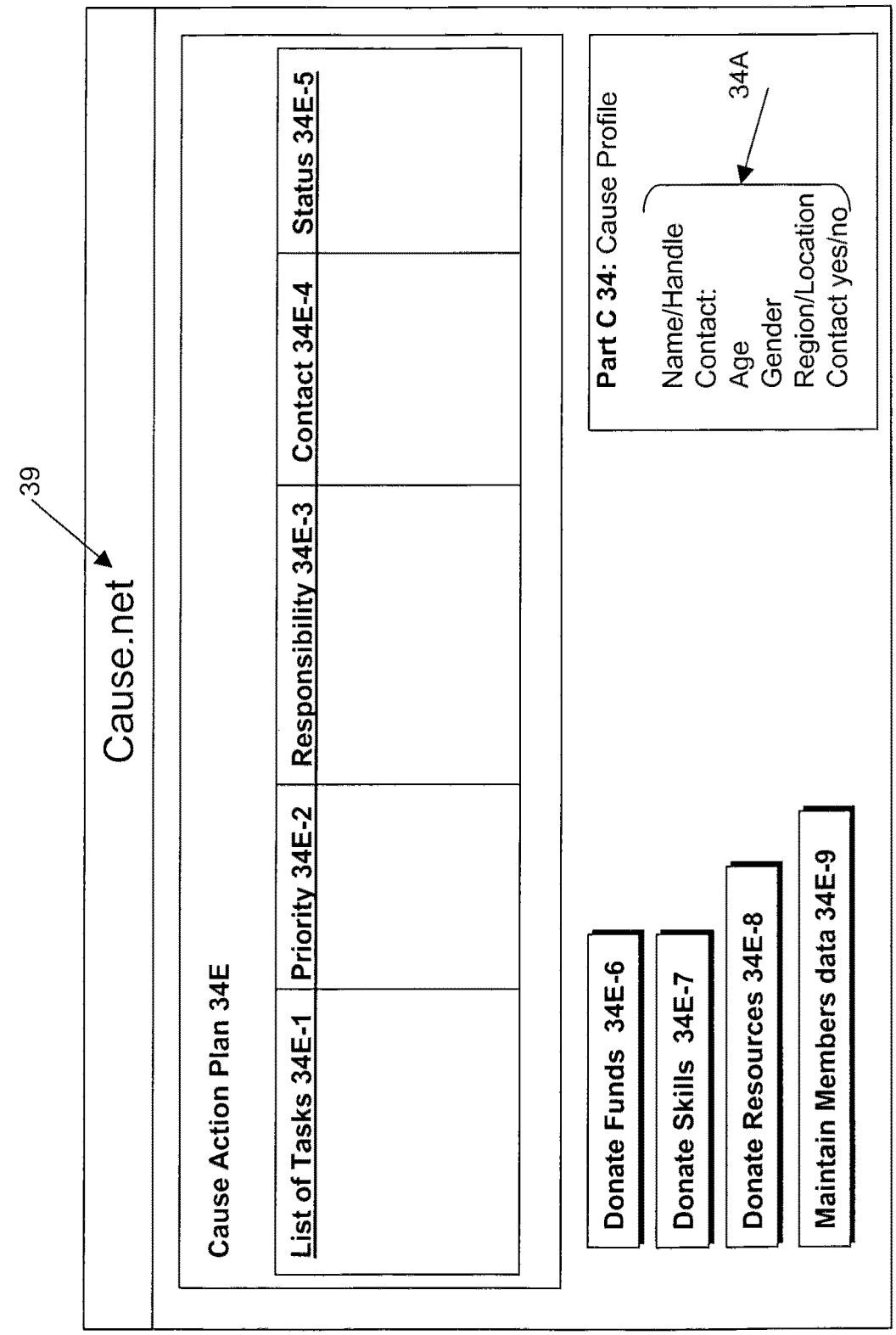

As illustrated in FIG. 3B, the web page displaying the cause action plan 34E, provides for a list of cause-associated tasks 34E-1, a priority for each task 34E-2, responsibility for each task 34E-3, contact information for each task 34E-4, and a task status 34E-5. These cause action plan 34E data elements define the status and progress of a cause action plan and its individual tasks and responsibilities in some detail for the social-cause community to coordinate with and cooperate with members to fulfill the cause purpose. There may be other and additional data fields for the cause action plan that are not ruled out.

In addition, the action plan 34E enables the members and other benefactors to donate funds via the donate fund link 34E-6, donate skills, via the donate skills link 34E-7, and donate resources via the donate resources link 34E-8. In some embodiments, the cause action plan as illustrated in FIG. 3B may be eliminated and some of the links in FIG. 3B may be displayed on FIG. 3A itself. As a simplified illustration, in FIG. 3A, the donate funds link may replace the cause action plan link.

As also illustrated in FIGS. 3A and 3B, in addition members of the cause community via the maintain members data link 34E-9 may identify themselves as members of the community and may interact with each other via the communication/dialogue link 34C, as shown in FIG. 3A.

Each of these links opens up a web page of its own to facilitate the purpose of that link. In addition the Part C cause profile 34A may be displayed in FIG. 3B to maintain continuity from the web page as shown in FIG. 3A.

Cause-Based Social Community

The different parts of the cause-message 31, as illustrated above, support creating, fostering and sustaining cause-based social communities globally. These communities may be created, then expand, then sustain themselves and then decline and eventually die as the need for the cause may change or disappear or the champions of the cause may pursue other endeavors. The cause-server 12 would maintain the historical data of the causes in a historical database and categorize each cause based on its archival status enabling the public at large to search for live, growing, stable and defunct cause-based social communities.

The status of each cause and cause-based community on an ongoing and periodic basis may be determined and computed automatically by a functional logic in the cause-server. The functional logic may use any number of input parameters that may include number of members, page views, and rate and frequency of social communication among the members. The cause-based social communities may be further categorized by region, size of membership, cause category, and cause purpose. The growth status of each social community, live or dormant or defunct, may be shown to the public and the social communities with the help of a graph as described later with reference to FIG. 8C.

Figure 4:
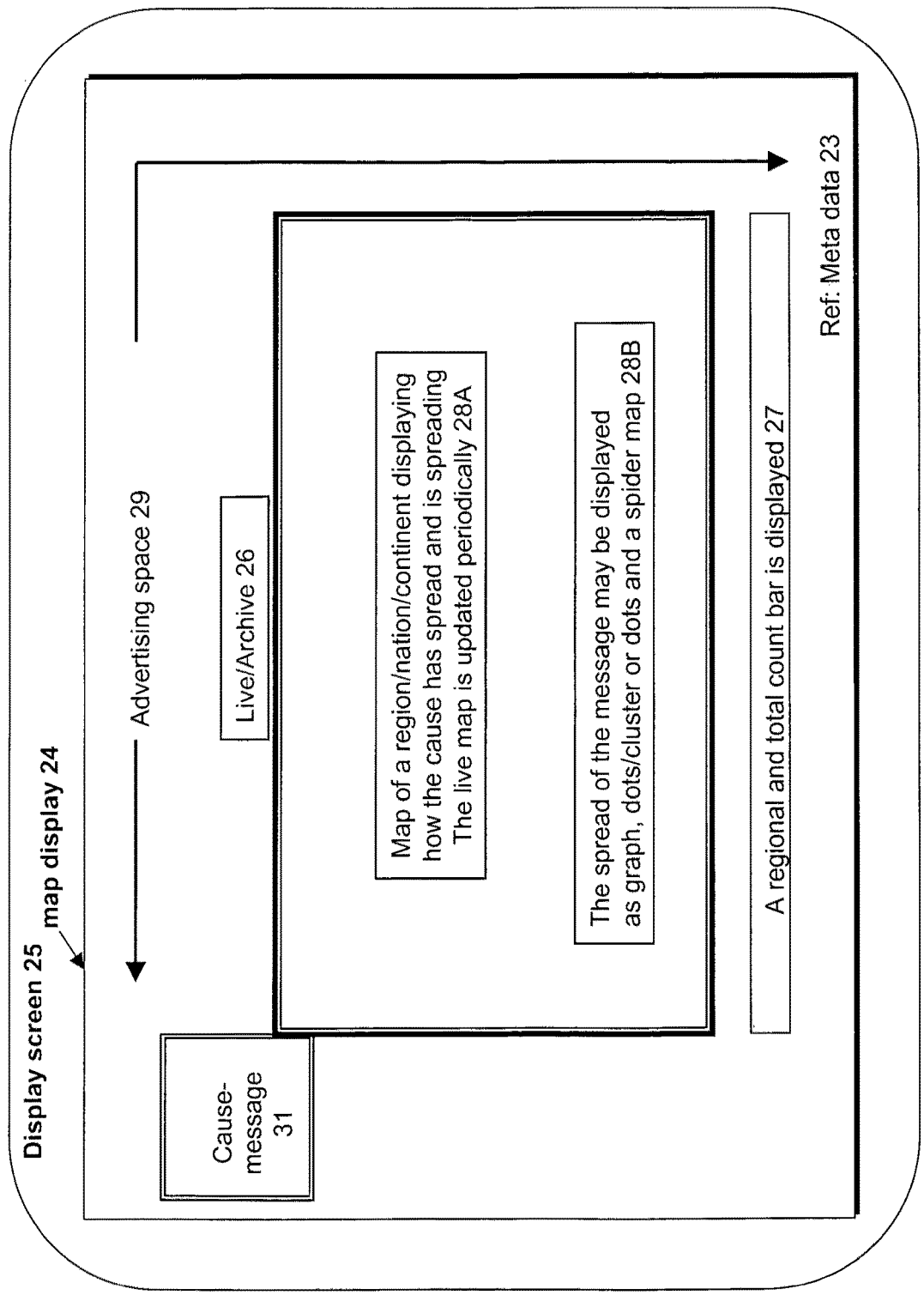
FIG. 4 is a block diagram of the display screen of the present embodiments for showing a geographic map and a cause-message for visually showing the spreading and the spread of a cause-message across the globe.

As illustrated with the help of FIG. 4, in one of the embodiments, the social-community application 52 creates a map display 24, on a display screen 25, with a geographic map 28A showing the spread of the message 28B that shows the locations of the original mobile device and the locations of the first ring and subsequent ring mobile devices that have clicked the link to receive the cause-message.

The cause-server 12 downloads the map display 24 to anyone with a display on a display screen 25. The map display 24 provides for (i) a geographic map in the middle 28A, (ii) the cause-message 31 displayed on a part of the screen, (iii) the running count of cause-message spread in the bottom space 27, and (iv) other space in the display screen as advertising space 29. The map display 24 with the map contents 28A, 28B, 27 and 29 are updated periodically. A legend indicating live/archive 26 on the map shows whether viewers are looking at the display map of a live cause-message or an archived cause-message based social-community.

The spread out of the cause-message 31 may be displayed on the map 28A as clusters of light points and may also be displayed as a spider chart. A time out for the cause-message spread is declared when the rate of spread falls below a threshold and the total count by region is displayed 27 and the map is frozen and archived for subsequent retrieval searchable by cause identification, original mobile name and date range. The map 24 also displays the Meta data reference 23 that enable the map to be identified in the database of the cause-server 12.

Cause-Message 31 Examples

Figure 5B:
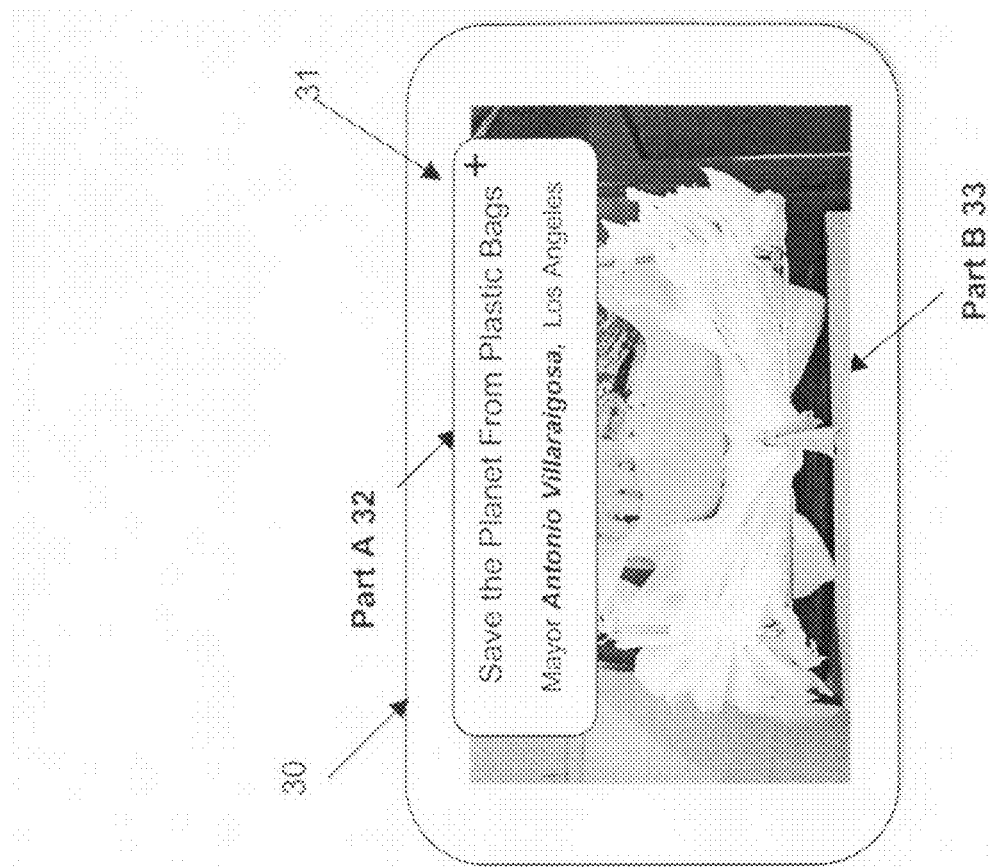
FIG. 5A-5B-5C show simplified illustrations of examples of three different cause-messages displayed on mobile devices.
Figure 5A:
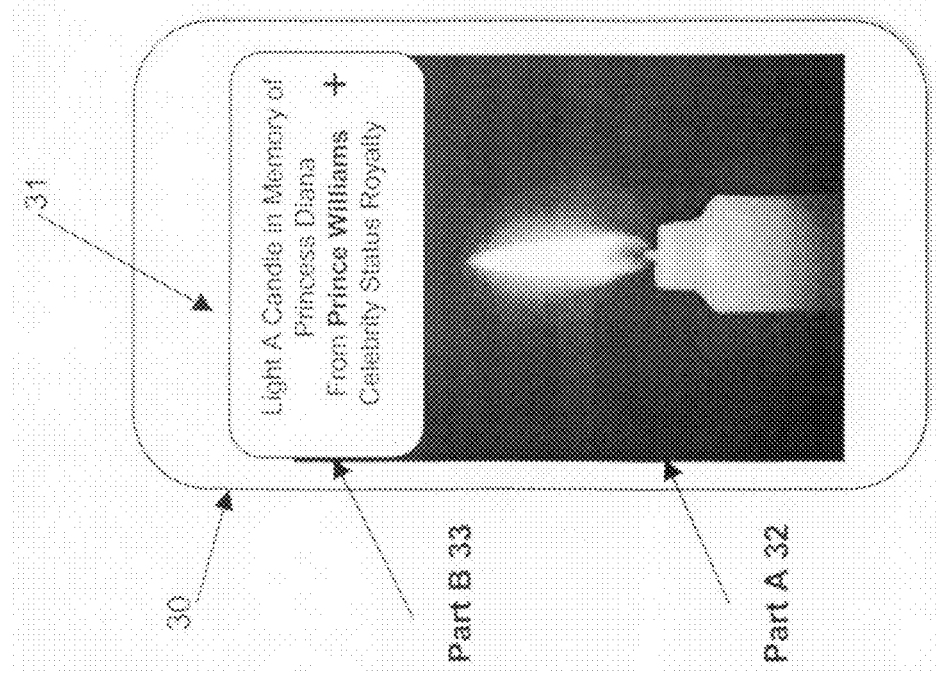
Figure 5C:
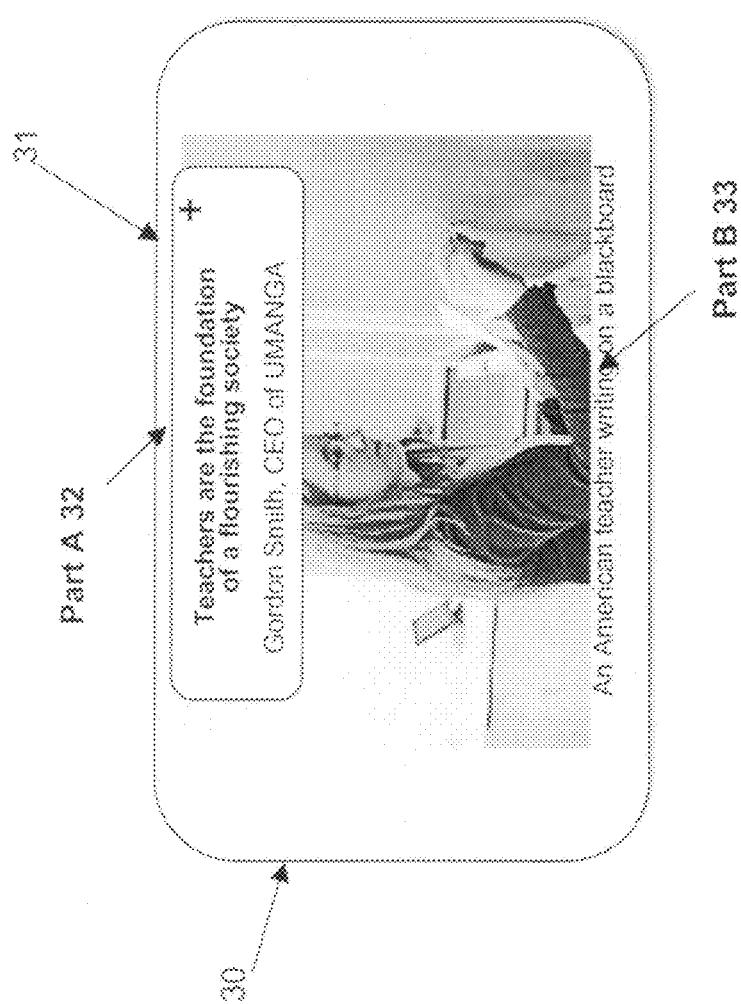

FIGS. 5A, 5B, and 5C illustrate examples of the cause-message 31 and how such a cause-message would appear on the screen of a wireless mobile device 30. FIG. 5A illustrates an example of a cause-message for international interest that would spread internationally. This cause-message 31 is that of lighting a candle in memory of Princess Diana. The message 31 includes an image of a lighted candle or a candle being lighted by another candle, a text message identifying the cause, and who the cause is from. In this example, the cause may be from Prince Williams with his celebrity status, as royalty. The cause-text message may be "Light a Candle in Memory of Princess Diana". The icon link, if present, provides for details of the message 31 in a web page as described earlier with the help of FIG. 3A. These details may provide for additional text and pictures of Princess Diana and her family, as well as seek donations for the causes she had championed while alive. The text may also carry statements from other royal family members and people who had known Princess Diana and how she is missed.

The cause-message 31 for Princess Diana may be spread in any number of ways. It may be spread via an originating mobile device as illustrated earlier with the help of FIG. 1. If people are gathered in a park or parks and places around the globe, they can all hold up their mobile devices 30 to show a lighted candle. The cause-message 31 may also be spread by e-mailing people the link to the cause in the cause-server. Alternatively, the cause may be searched for and accessed directly on the social-server 12 by anyone globally.

FIG. 5B illustrate a regional message from a mayor of a large city such as Los Angeles. The cause-message 31 is for spreading the awareness that plastic bags harm the environment. Again if the icon link is present, it provides for details of the message 31 in a web page as described earlier with the help of FIG. 3A.

The contents of FIG. 3A for this cause may include additional text, data and images on how the plastic bags harm the environment. In some aspects this information may serve as educational resource for the community and for the class rooms.

Further an action plan may be utilized as shown in FIG. 3B that would identify tasks people can do and coordinate for cleaning the environment of a large city, area by area and also to put up posters to raise awareness. For example, volunteers may be asked to show up at a location to clean the area of the plastic bags and or take a class on benefits of recycling.

FIG. 5C illustrates a message from a CEO of a business enterprise to support teachers and education. Again if the icon link is present, it provides for details of the message 31 in a web page as described earlier with the help of FIG. 3A. These details in the form of images and text may include historical and current data for the roles teachers play in the society and the importance of such roles for the society. They may also include biographical data of exemplary teaches. The cause-action plan for this example may include concrete tasks to further the purpose of the cause. These may include coordination and set up of meetings and classes for teachers as well as a grass roots campaign for gathering ideas to improve the education at different levels. Again such cause-based information may act as an educational tool or information resource for students, parents and teachers.

Figure 6A:
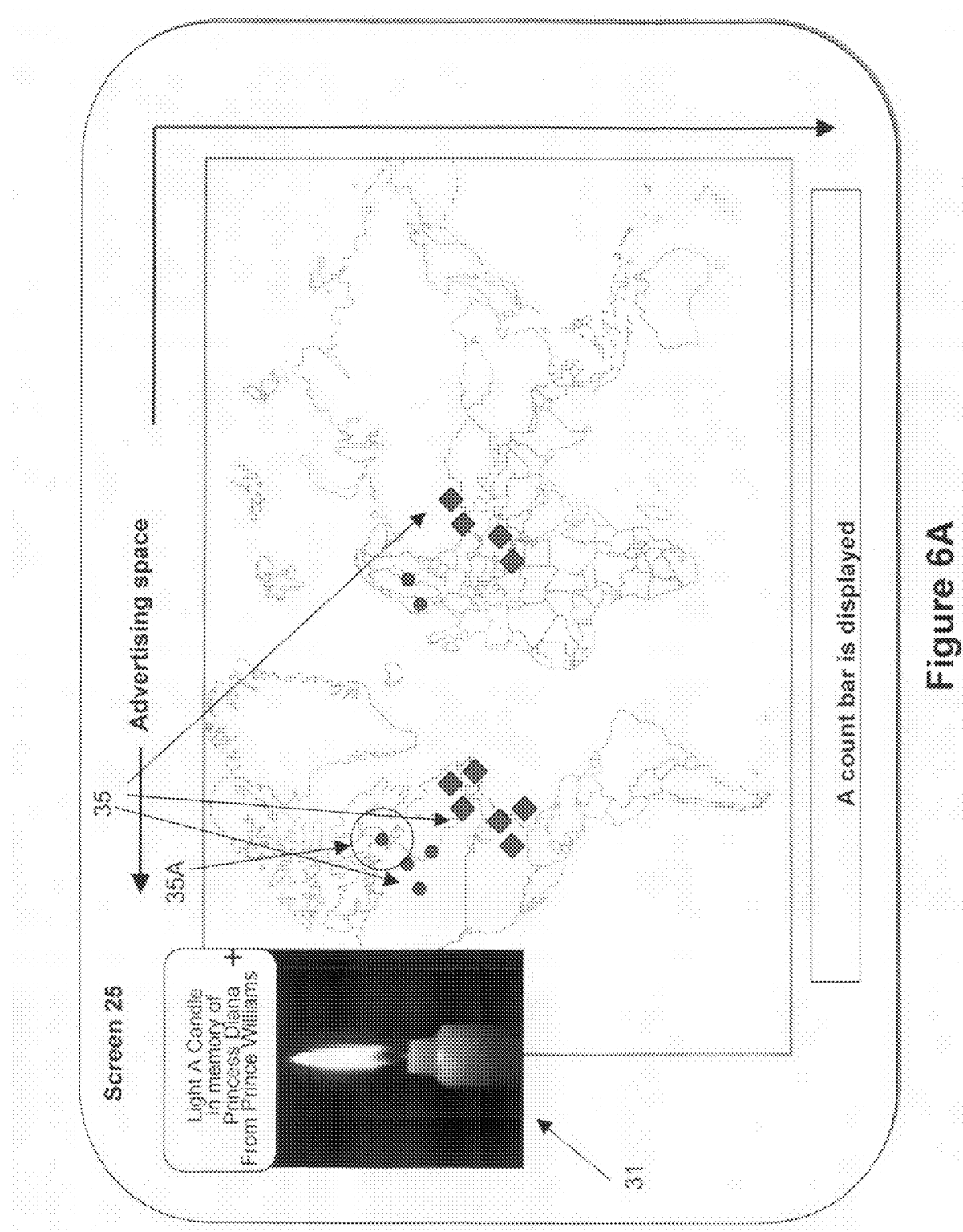
FIG. 6A-6B-6C show illustrations of three examples of cause-messages spread using mobile devices, displayed on geographic maps.
Figure 6B:
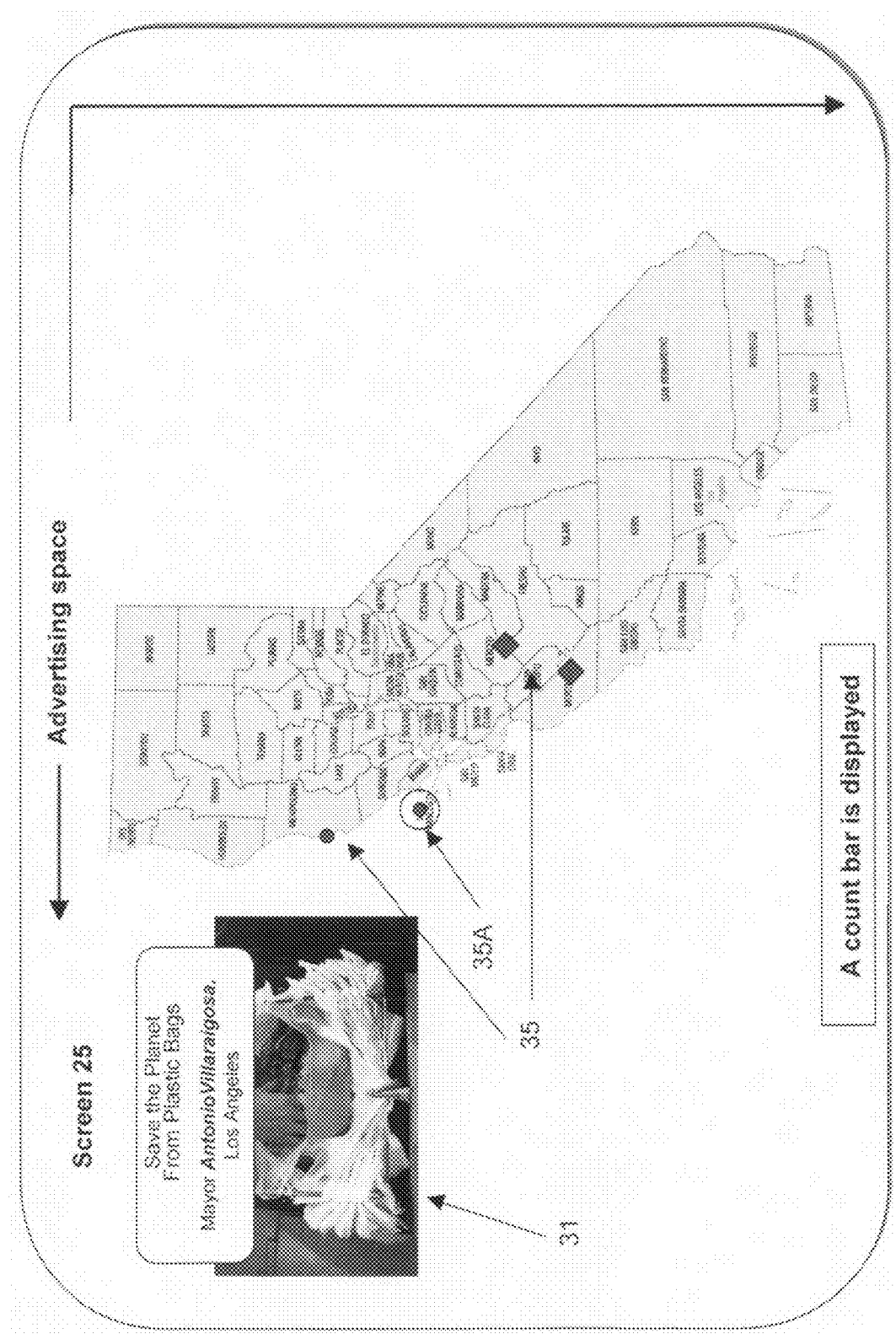
Figure 6C:
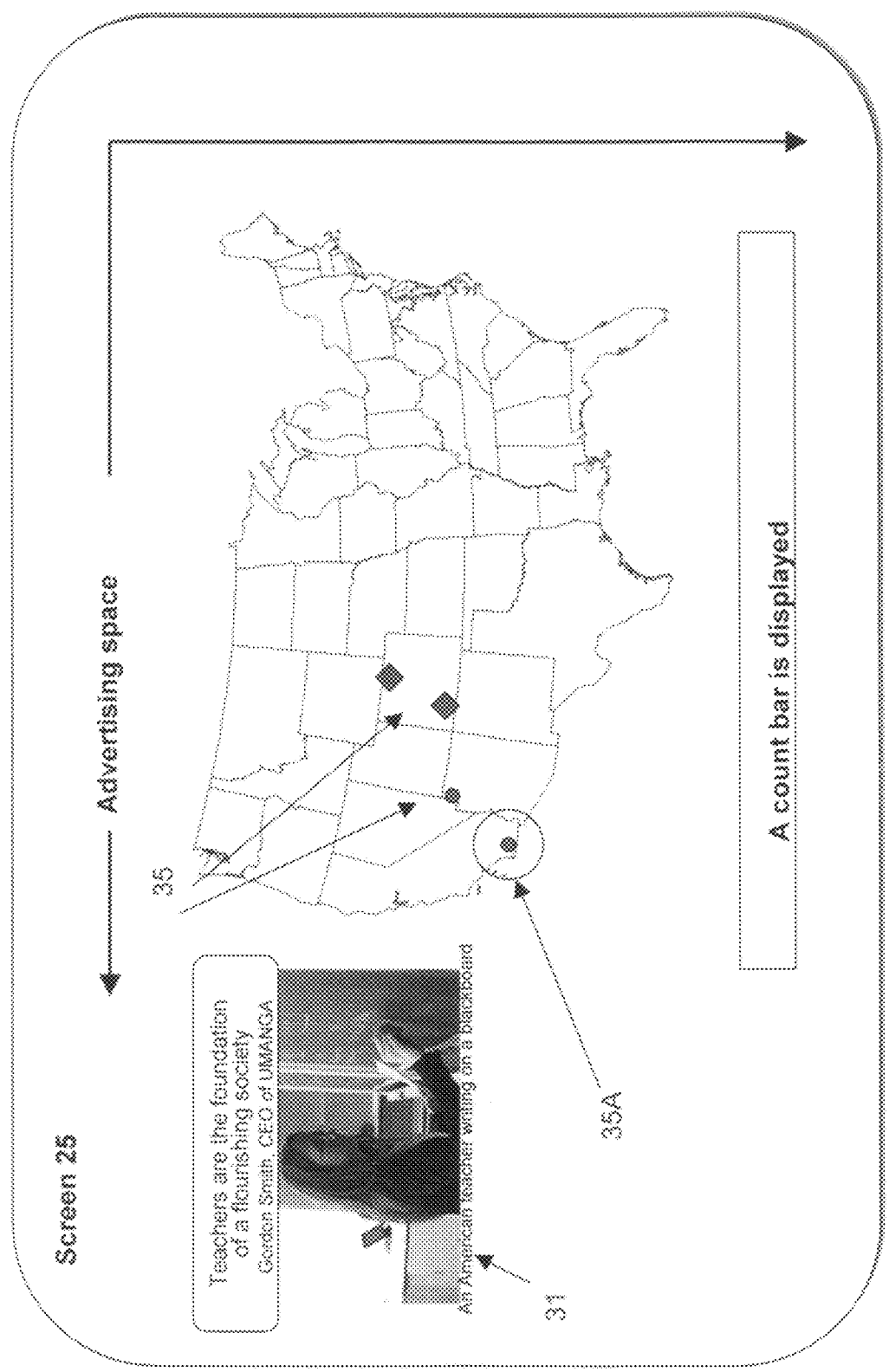

FIG. 6A-6B-6C illustrate simplified examples of regional and international maps that show how a cause-message of example 5A or 5B or 5C may be spreading via the mobile devices, with the clusters of message spread identified by areas 35 on the map display, where the originating mobile device is identified by location 35A. These maps help create a sense of community for the cause, as well as for everyone else by visually showing to the like minded people who believe and resonate with that cause. This form of information helps create a sense of social community by knowing how many like-minded people there are and which part of the world they are located in.

Causes that Create a Social-Community

As illustrated in FIG. 7, examples of categories of causes 36 are identified and usually begin with an action verb. They may include, Save, Free, Support, In Memory Of, In Remembrance, Be A, Love, Fight, Donate funds, Donate Skills, Show, Find me a, and Light a candle. These are simplified illustrations and may include an unlimited variety of causes spanning any area of human endeavor. A cause is something with which people passionately associate with and want to spread that cause and find other like-minded people who support that cause. The embodiments described herein facilitate that purpose globally using easily accessible mediums of computers, mobile wireless devices and the global computer network.

As further illustrated in FIG. 7, some examples of causes 38 are illustrated. They may include, Save whales from extinction, Save koala beer, Support K-12 education, Support our teachers, In memory of Ronald Regan, In remembrance of Princess Diana, Save our planet from plastic bags, Support teacher xyz, Fight Apathy, Be an Animal Lover, Show appreciation for a good deed, Find me a good Samaritan, Love a poet, Donate skills to show by example, and Donate funds to open a new learning center.

As also illustrated in FIG. 7, Examples of images 37 are illustrated. They may include, a lighted candle, a candle being lighted by other candle, a dove, a flying dove, a soldier, a person, and a teacher in action. There is no limit to the creativity of people in illustrating a cause visually and they may all be used.

The cause-based social community may be based on any cause that may include charitable, social, political, economic, religions, sports, common interest and hobbies, and cultural causes. The social community may be any size, local, regional, national or global. The large social communities may include regional based sub-communities or chapters. The social community may include student based organizations and fraternities, and social and hobby clubs. There is no limit on the type and size of the social community as long as it is for a legal purpose.

Social Community Web Page 40

Figure 8A:
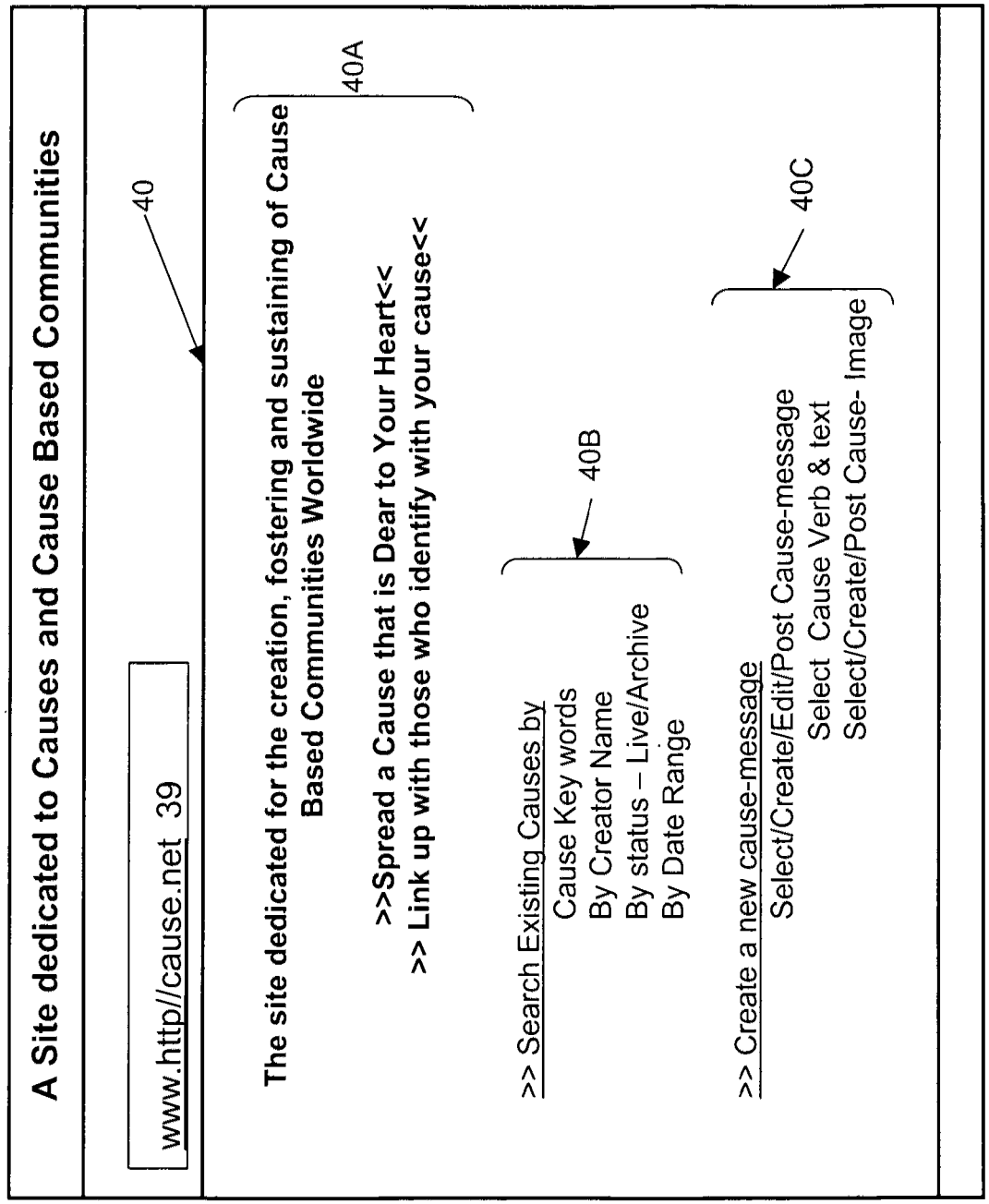
FIGS. 8A, 8B and 8C are block diagram that illustrates features of the present embodiment of web pages to create and foster cause-message based social communities.

In addition to the web pages as illustrated and describe earlier with reference to FIG. 3A and FIG. 3B, there may be additional web pages. FIG. 8A illustrates one or more of these web pages from the cause-server 12 that is used to create new causes and cause-based social communities.

The content of the webpage 40 includes, (i) legends that define and describe the purpose of the social-community website 40A, (ii) functions to search existing causes and their social communities by any number of parameters 40B, and (iii) to be able to select, create, edit, and post causes and cause-supporting contents 40C in the cause-server 12.

The search function 40B enables search for existing causes by searching by cause keywords, by originator name, live/archive status, and by date range.

Figure 8B:
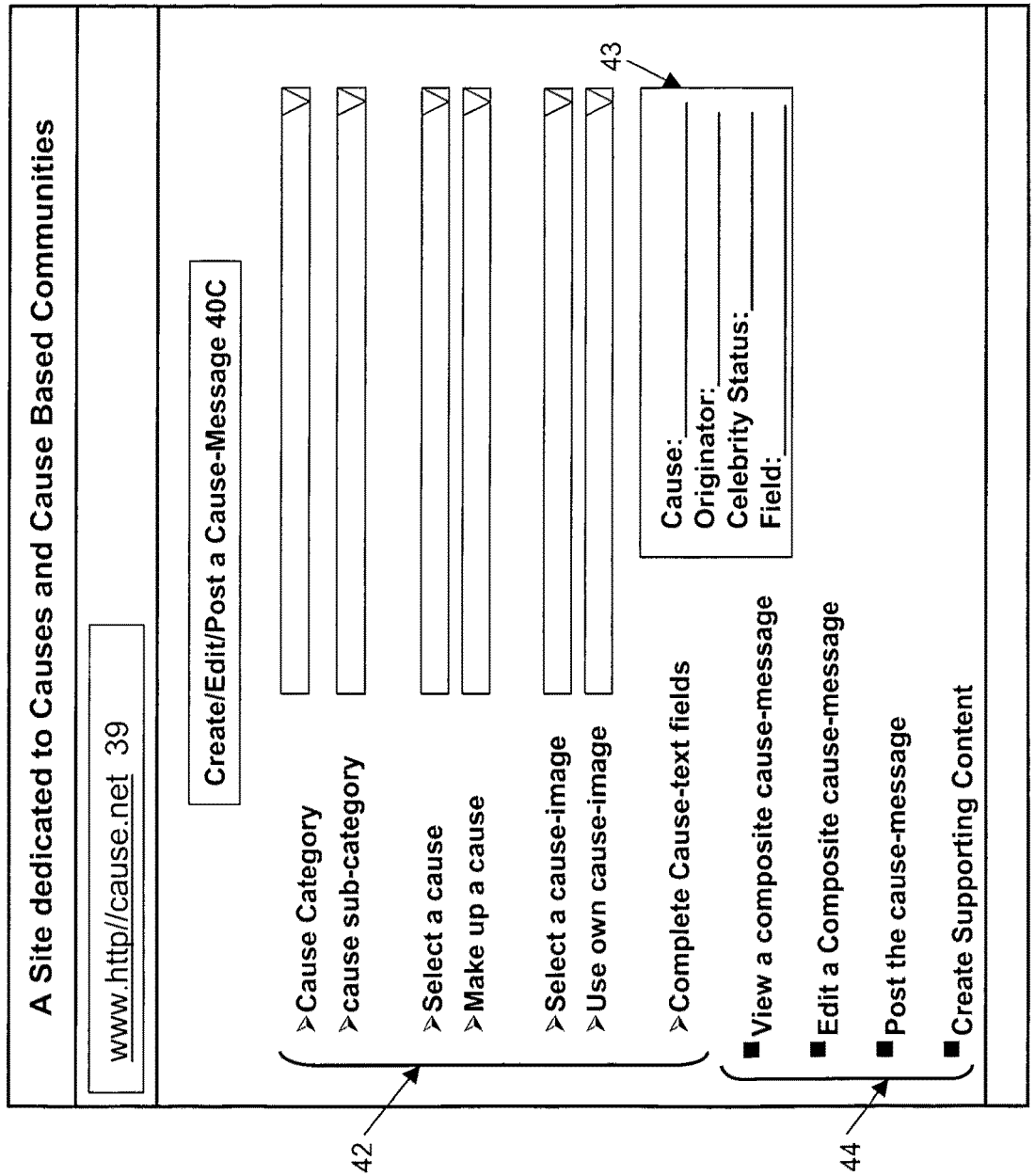

As illustrated in FIG. 8B with a simplified illustration, the web page 40C illustrates features that enable selecting, creating, editing, and posting causes and cause-supporting contents in the cause-server 12.

Features 42, as illustrated, provide the ability to select a cause category and a sub-category, select a cause from a drop down data entry box from a list of pre-stored causes in the cause-server 12 from that category. Alternatively a user may choose to make up own cause by entering the text of that cause. The size of the cause-text that may be entered is limited in total number of characters. Usually a cause is a phrase beginning with an action verb as illustrated earlier with the help of FIG. 7.

The features 42 further enable a cause-image to be selected from a list of pre-stored cause-images for the category and sub-category of causes in the cause-server. Alternatively, a user may select or make up own cause-image. The cause-image is limited in size to be able to fit on the screens of handheld mobile wireless devices. Such screens are usually two inches by three inches, although they may be a little larger or smaller based on the many varieties of smart phones from many different vendors.

The features 42 further enable different parts of the cause-text to be entered on a form 43. This form 43 copies the cause-text selected or created earlier and enables entry of data for the fields of cause-originator, celebrity status and field of celebrity.

The features 44 enable viewing of a cause-message made up as a composite of the cause-image and cause-text, as entered or selected earlier in the webpage form 40C.

These features 44 further enable editing of the composite cause-message, by adjusting the placement of the cause-text on the cause-image and be able to make minor editing changes to the cause-text.

These features 44 further enable the posting of the cause-message to the cause-server 12. These features 44 further enable the creation of the cause-message supporting content as described earlier with the help of FIGS. 3A and 3B. New and additional web pages (not shown) may be used to create the cause-message supporting content.

Figure 8C:
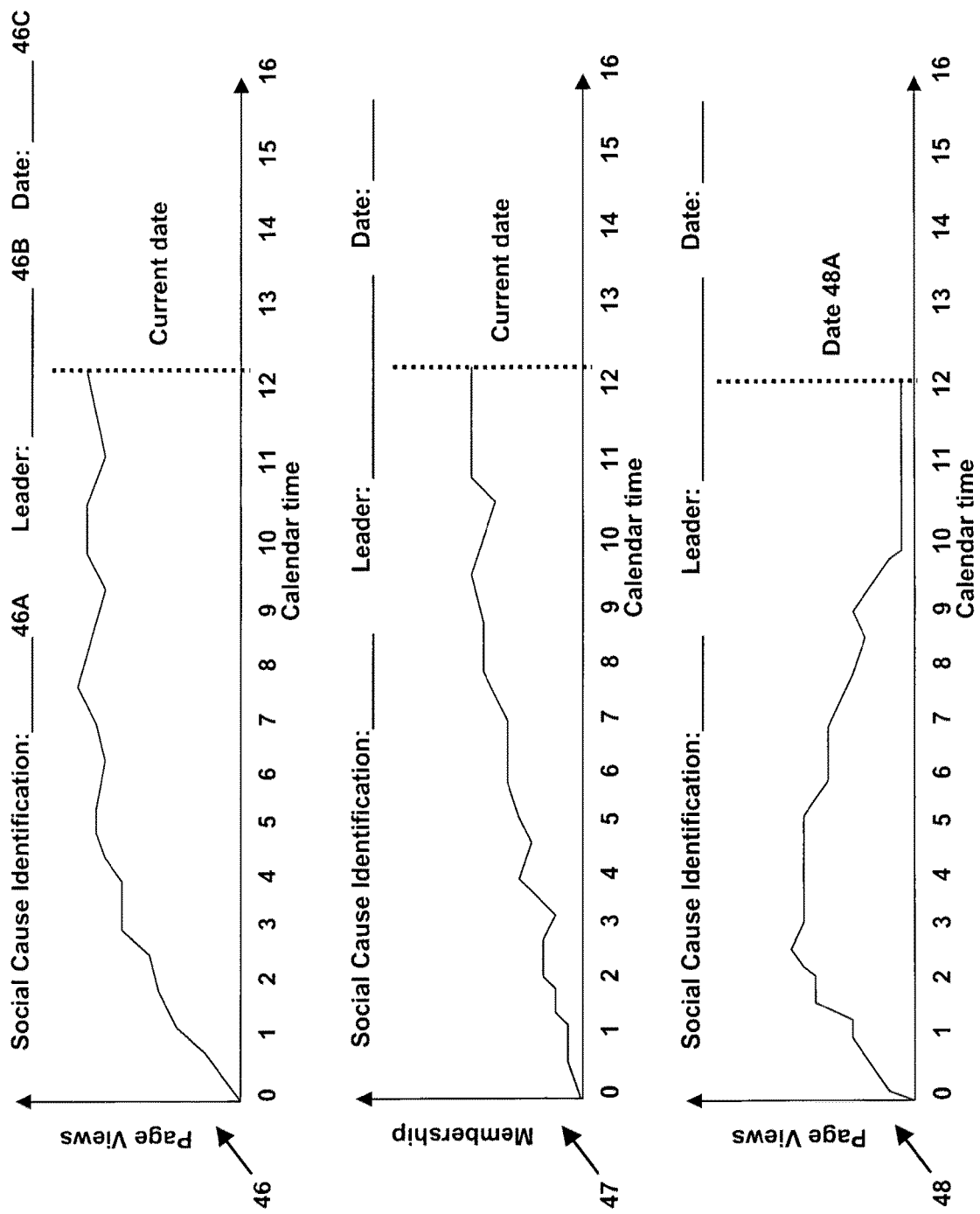

As has been described earlier, the social-community application 52 computes the growth and status of these social communities. As illustrated in FIG. 8C, charts and graphs may be used to show and illustrate the growth and status of these cause-based social communities.

The three primary ways to show status and activity of a cause-based social community in the cause-server may be by (i) tracking page views, (ii) number of members, and (iii) the frequency of communication among these members. Any one or all of these indicators may be used to show the status of a social community. Not all social communities may have members. Hence page views may be the default indicator of the size and activity of a social community.

As illustrated in FIG. 8C, a graph 46, for a live and growing social-community shows the legends of, social community identification 46A, the leader of the community 46B and the current date 46C. The graph 46 shows the page views on a vertical axis against calendar time on the horizontal axis to a current date. A similar graph 47, for a live and growing social-community shows the number of members on a vertical axis against calendar time on the horizontal axis to a current date.

A similar graph 48, for an inactive social-community shows the page views on a vertical axis against calendar time on the horizontal axis to a date 48A, when the number of page views over a time interval fell below a threshold indicative of a non-active dormant or defunct social-community.

These graphs may be used by the public at large as well as advertisers to learn which cause are active, which are on a growth path, a stable path, a decline path and are no longer active. This knowledge may be used in a variety of ways to study social-phenomenon.

Social Community Application 52

Figure 9:
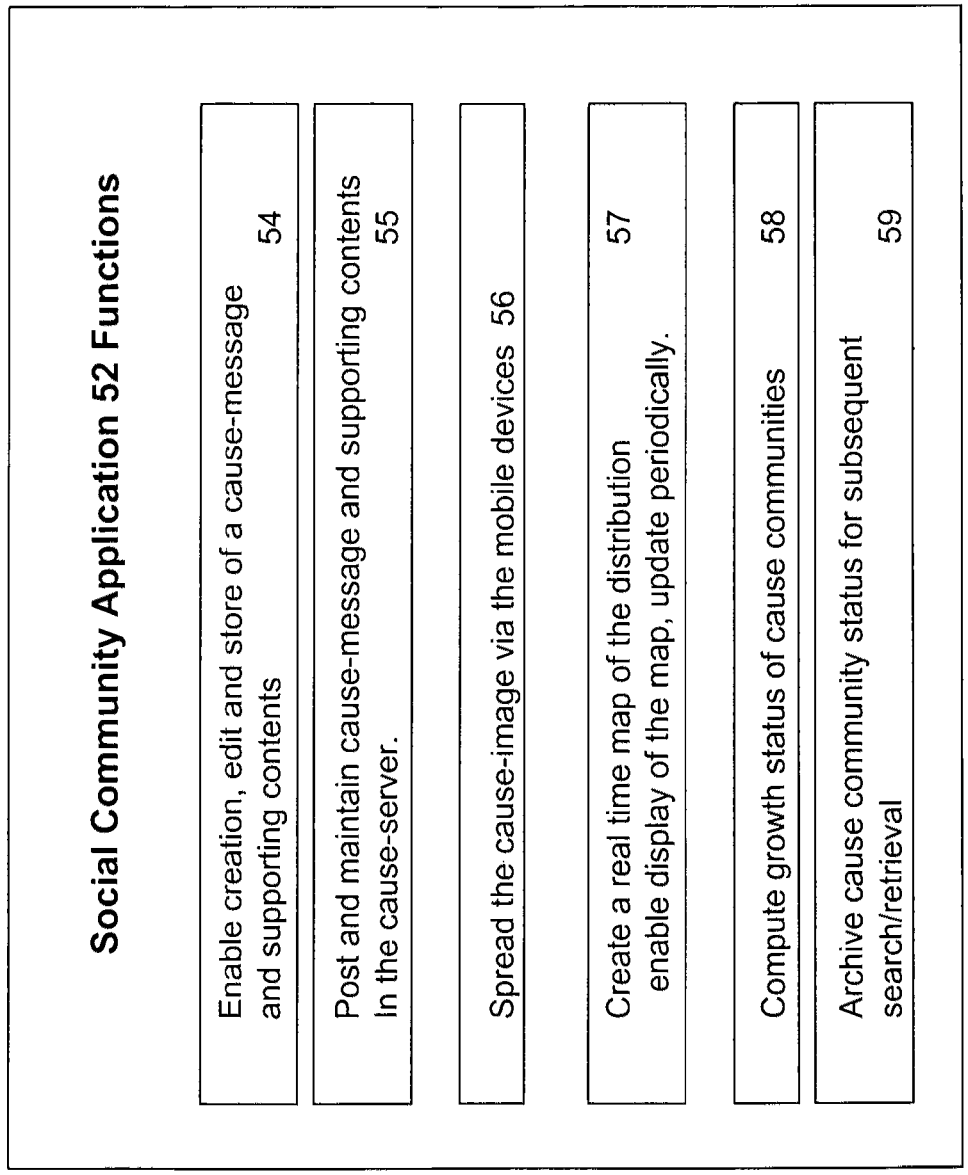
FIG. 9 is a block diagram that illustrates features of the present embodiment of the cause-based social-community application functions.

As illustrated in FIG. 9, the cause-server 12 hosts social community application 52 with functions as illustrated. The social community application 52 provides tools to support creation, edit and post of the cause-message 31, as illustrated earlier with the help of FIGS. 3A, 3B, 8A, 8B. The application 52 also provides tools to view the growth status of the social communities as illustrated earlier with the help of FIG. 8C.

The application 52 functions may include: (i) enable creation, edit and storage of a cause-message and supporting content 54, (ii) post and maintain cause-message and supporting contents 55, (iii) spread the cause-message via the mobile devices 56, (iv) create a real time map of the spread-out of the cause-message and enable display of the map updated periodically 57, (v) compute growth status of cause communities 58, and (vi) archive of the cause-message 31 and map 24 for subsequent search/retrieval 59. There may be other functions to support the creation and spread of cause-based social communities and are not ruled out.

The software technology that supports development of such functions is prior art and is used commonly in global internet applications.

Cause-Server 12

Figure 10:
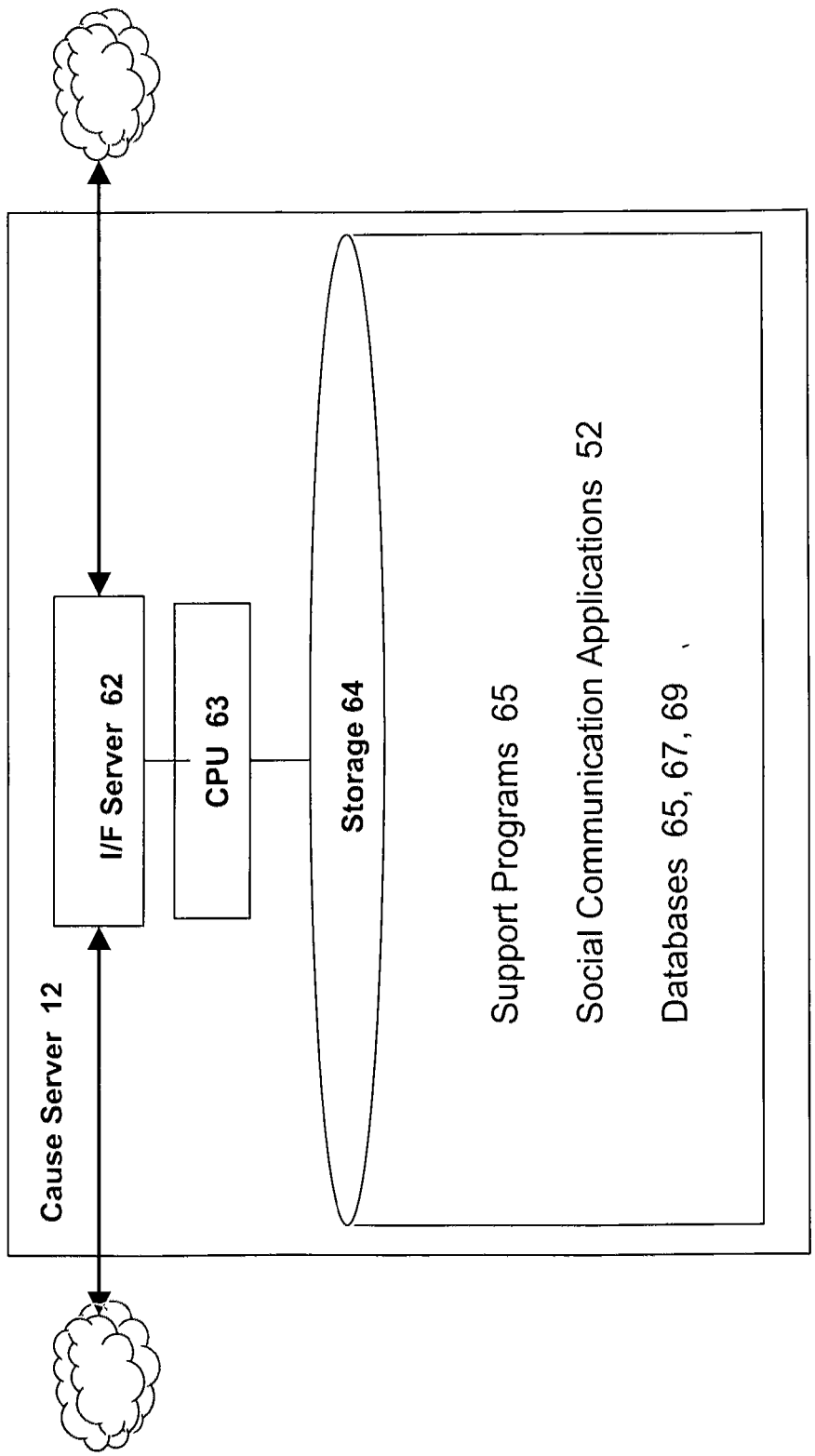
FIG. 10 is a block diagram that illustrates features of the present embodiment of the social community cause-server.

FIG. 10 illustrates a simplified illustration of the cause-server 12. The cause server 12 has an interface server 62 to facilitate interface to the global network for both the mobile devices and the other computers. The cause server 12 has one or more CPUs 63, and storage 64. The CPUs 63, storage 64 and the support programs 65 support high speed execution and interactions with a large number of users worldwide.

The cause-server 12 technology including the server and support software and interfaces is prior art and is used in many other applications on the global network. The social communication application 52 with its associated databases 65, 67 and 69 and their interfaces with the mobile devices are unique to the embodiments described herein.

Cause-Server Databases 65, 67 and 69

FIGS. 11A and 11B illustrate the databases used in the cause-server 12. The social communication application 52 functions that use these databases are illustrated earlier with the help of FIG. 9.

As illustrated in FIG. 11A, there is a cause-message database 65 that stores data related to the cause-message 31. The cause-message data storage may be supported by data fields of (i) a cause-identification, (ii) part A, part B, part C of the cause-message, (iii) and the cause-originator and their contact information. The cause-message spread map database 67 may store data related to the spread of the cause and may include data fields of cause identification, cause-text, cause-image, spread count rate at different times, a final map image, begin time of the cause spread and end time of the cause-spread.

As shown in FIG. 11B, the cause-message search database 69 may store data related to causes that support search and retrieval of causes, with fields of cause identification, cause region, originator identification, cause location, cause size, cause category, cause status, and date range. These fields help narrow down the search of causes that may be of interest to members of the public to learn and or to join the cause itself.

Additional databases may also be used that support advertising messages that may be displayed on the spread map and the web-pages used for displaying the cause-message 31. Other and different databases may also be used and are not described here and are not ruled out to support the various functions of the cause-server and the social community application 52.

Modes of Operation

The modes of operation of the cause-based communities depend upon the purpose and scope of the cause. For a simple cause, the cause originator creates a cause-message 31 as illustrated earlier in FIG. 2. The cause-message may be created by first creating and or selecting a cause-text and providing cause-originator information. Then a cause-image is selected to illustrate the cause-text. The cause-image may be selected from a list of provided cause-images in the cause-server. Alternatively the originator can provide own cause-image. With the selection of the cause-text and the cause-image, a cause-message is completed and displayed for approval. The web pages that support creating, editing and posting cause-message have been described earlier with reference to FIGS. 8A and 8B.

The originator then spreads the cause-message by posting the cause-message to the cause-server by the mobile device and receiving a server link to the cause-message from the cause-server. The cause-originator then spreads the cause-message from the server by the originating mobile device sending via SMS and e-mail, a message and the server link to the selected contact list of the originating mobile owner, who have smart phones that are enabled for web-access. The receiving mobile devices read the message and choose to join the cause by clicking on the server link to receive the cause-message.

The receiving mobile devices similarly forward a message to other mobiles on their own contact list, where each mobile owner receiver chooses to join the cause by clicking on the cause link and receiving the cause-message. The cause-server for each cause-message request from the mobile devices, receives the mobile devices' geographic locations. The mobile devices are equipped with location features based on using GPS functionality in each mobile device. Such GPS based location functionality has become common in the mobile devices and is also being mandated by the FCC to support 911 emergency calls.

Prior art software technology related to browsers and links provides the functionality to be able to embed a reference to a software function and automatic execution of that function when the link is activated. Such prior art software technology is used to embed a function in the server link, that collects the GPS location of the mobile device, sends as data to the server and loads a function identified as a version of the mobile application part. This function enables each of the mobile devices to repeat the steps of the originating mobile device in spreading out the cause-message.

An e-mail format supports html data format that supports and provides such functional capability. However, SMS text messages are limited and may not support such capability. Therefore, a combination of text messaging and e-mails may be used, where the text message is used as an advisory and alert for the link contained in an e-mail based message. Twitter and Facebook applications may also be used to send alert and advisory messages as they enable messages to be sent to the list of contacts identified in these applications.

The cause-server creates a regional map of the mobile locations that shows the spread of the cause-message globally. The map may show the location of the mobile devices on the map as clusters of points or a spider chart. The map may be downloaded from the cause-server to others to visually see how the cause-message has spread and is spreading.

Additionally and optionally the originator may add cause supporting content 34 as illustrated in FIG. 3A. For a one time cause, the cause originator creates a cause-message 31 without the supporting contents and distributes the message via the mobile devices. For a more complex cause, the cause originator creates the cause message along with the supporting contents as in FIG. 3A and a cause action plan as in FIG. 3B.

The receiving mobile devices when they receive a cause-message, know if there is additional supporting content by the presence of the link 33E, and clicking the link provides then the additional content 34 of the cause-message.

In another mode of operation, where the cause-message is more detailed or complex, as illustrated in FIGS. 3A and 3B, the mobile devices may not be used, instead computers such as laptops, tablet computers and home based computers may be used to create, edit and post the contents of a cause-message and its supporting contents.

Methods of Operation

As shown in FIG. 12A, in an embodiment, a method is used for creating and spreading the cause-message. The method has the following steps, where all the steps may not be used or used in the order specified. A method of social communication on a global net has the steps of:

At step 70, enabling creating a cause-message by an originating wireless mobile device via a social-communication application operable in a cause-server, by selecting a cause-image and a cause-text for overlay on the cause-image.

At step 71, enabling posting the cause-message to the cause-server by the mobile device and receiving a server link to the cause-message from the cause-server.

At step 72, enabling spreading the cause-message from the server by the originating mobile device by sending via SMS and e-mail, a message and the server link to the contact list of the originating mobile owner.

At step 73, enabling reading the message by other mobiles and choosing to join the cause by clicking on the server link to receive the cause-message.

At step 74, sending by the receiving mobile devices similar messages to other mobiles on their own contact list, where each mobile owner receiver choosing to join the cause by clicking on the cause link and receiving the cause-message.

At step 75, receiving by the cause-server for each cause-message request from the mobile devices, the receiving mobile geographic location.

At step 76, creating a map of the mobile locations that shows the spread of the cause-message globally.

At step 77, downloading the map to others to visually show how the cause-message has spread and is spreading.

As shown in FIG. 12B, in another embodiment, a method is used for the cause-message. The method has the following steps, where all the steps may not be used or used in the order specified. A method of social communication on a global net has the steps of:

At step 80, enabling creating a cause-message by a cause-originator by a social-communication application operable in a cause-server.

At step 82, enabling posting a cause-message to the cause-server.

At step 84, enabling spreading the cause-message message from the server.

At step 86, enabling creating the cause-message in multiple parts of, a cause-text and a cause-image.

At step 88, enabling creating the multiple parts of the cause-message, where part A has an image, part B has a cause-text that is overlaid over part A, where part B includes identifying the cause-originator and the celebrity status of the cause-originator.

At step 90, maintaining databases in the cause-server enabling search and retrieval of the cause-messages by others;

At step 92, downloading the cause-message to mobiles and sending links to the cause-message to others by e-mail and text messages enabling the message to spread out.

At step 94, enabling creating a cause-message supporting content that is associated with the cause-message, the supporting content may include from a group of, cause-originator information, cause-support data and images, dialogue/communication with other, and link(s) to similar and supporting causes in the cause-server.

At step 96, enabling creating and maintaining a cause-message based community via the different parts of the cause-message and cause-supporting content.

A system of creating and sustaining a social community on a global net, has a cause-message. The cause-message has an associated cause-image part and a cause-text part, where the cause-image is sized to fit the screen of handheld mobile wireless devices and the cause-text is sized to fit on a portion of the cause-image.

The cause-message is stored in a cause-server database of a cause-server and accessible to others by search and retrieval based on fields that include, categories of causes, a cause-identification, cause-originator-identification, or a date range, where the cause-message supports creation of a cause-based social community. The cause-text part identifies (i) a cause, (ii) an originator of the cause by a name/handle, and (iii) a celebrity status of the originator.

The cause-text part of the cause-message begins with a verb part identifying the cause, where the verb may include from a group of, save, free, support, in memory of, in remembrance, be a, love, fight, donate, show support, find me a, pray, or light a candle. The cause-image part may be a single image, a flash animation, a video and any other image format that visually illustrates the cause.

The cause message may be originated by a mobile device owner and is spread by the mobile device owner, sending the cause-message link in the server to a list of contacts and they in turn forwards the link to others in their own contact lists.

The social-communication application enables creation of the cause-message. The application also enables creation of cause-message supporting content that is associated with the cause-message. The supporting content may include from a group of, cause-originator information, cause-support data and images, dialogue/communication with others, and link (s) to similar and supporting causes in the cause-server.

The application enables creation and maintenance of a cause-message based community via the different parts of the cause-message and cause-supporting content.

A method of social communication on a global net has the steps of, where all the steps may not be used or used in the order specified:
  a. enabling creating a cause-message by a cause-originator by a social-communication application operable in a cause-server;
  b. enabling posting the cause-message to the cause-server; and
  c. enabling spreading the cause-message from the cause-server.
  d. enabling creating the cause-message in multiple parts of, with an associated cause-image and a cause-text; and
  e. overlaying the cause-text on a portion of the cause-image.
  f. enabling creating the multiple parts of the cause-message, where cause-text that is overlaid over the cause-image, identifying a cause, a cause-originator and a celebrity status of the cause-originator.
  g. maintaining databases in the cause-server enabling search and retrieval of the cause-messages by others;
  h. downloading the cause-message to mobiles and sending links to the cause-message to others by e-mail and text messages enabling the message to spread out.
  i. enabling creating a cause-message supporting content that is associated with the cause-message, the supporting content may include from a group of, cause-originator information, cause-support data and images, dialogue/communication with other, and link(s) to similar and supporting causes in the cause-server.
  j. enabling creating and maintaining a cause-message based community via the different parts of the cause-message and cause-supporting content.

A system of social communication on a global communication network, has a social-communication application operable in a server on the global computer network, the server identified as a cause-server, where the social-communication application has a server part and a wireless mobile device part, where further the mobile device part down loadable to wireless mobile devices, an originating mobile device using the application enables creation of a cause-message, the cause-message is upload by the originating mobile device to the server along with the mobile device position.

The cause-server stores the cause-message in the server and sends the server link to the originating mobile device, the mobile device part creates a text message and an e-mail, embeds the server link with the message, and broadcasts the message to a list of mobile device's contacts in the originating mobile device, enabling the other mobile receivers identified on the list to receive the cause-message. The other mobile receivers, also identified as a first ring of mobile devices open the message, choose to join/associate with the cause and click the link to load the cause-message to their own mobile devices from the cause-server along with a mobile app version to enable them to broadcast the cause to their list of contacts.

The application stores the first ring mobile device locations in the cause-server, and sends the cause-message to the respective mobile devices (the second ring mobile devices), when they load the cause-message with an application program that repeats the broadcasts to each one's mobile contacts, thus a third set of rings, and so on are created enabling the cause-message to spread out via successive rings of mobile devices.

The application stores in a database, data related to the mobile locations, the cause-message, and the computations of rate and location of spread of the cause-message. The application creates a geographic map showing the spread of the message showing the locations of the original mobile device and the locations of the first ring and subsequent ring mobile devices that have clicked the link to receive the cause-message.

The cause-server down loads the map to anyone with a display on a display screen of (i) the map in the middle, (ii) the cause-message displayed on a part of the screen, (iii) the running count of cause-message spread in the bottom space, (iv) and uses the other spaces of the display screen as advertising space. The map and the display are updated periodically with an updated map and advertising space content.

The spread out of the cause-message may be displayed on the map as clusters of light points and may also be displayed as a spider chart. A time out for the cause-message spread is declared when the rate of spread falls below a threshold; and the total count by region is displayed and the map is frozen and archived for subsequent retrieval searchable by cause id, original mobile name and date range.

The cause-message has a cause-text part and a cause-image part, where the cause-text part is overlaid over the cause-image part, creating a composite cause-message. The cause-text part of the cause-message begins with a verb part identifying the cause, where the verb may include from a group of, save, free, support, in memory of, in remembrance, be a, love, fight, donate funds, donate, show, find me a, light a candle.

In summary, the embodiments herein are on systems and methods for a social community application in a cause-server that enable creation and maintenance of a cause-message and spread out of the message via mobile devices and global net that would foster and sustain cause-based communities globally. The different parts of the cause-message 31, as described above support creating, fostering and sustaining cause-based communities globally.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A system of creating and sustaining a cause-based social community on a global network of computers, comprising:
a cause-server, a cause-server database, and a social community application, the system operative with the social community application, wherein the social community application provides for creation of a cause-message, and wherein the cause-message comprises a specific multi-part structure that comprises identification of a cause via a cause-image and a cause-text message and a cause-originator overlaid over the cause-image, and wherein the cause is associated with members of the cause-based social community, and wherein the cause-message supports creation of either an ad hoc or permanent cause-based social community and wherein the cause-message is exclusively for causes that include at least one of, charitable, social, political, religious, and sports;
the cause-message comprises the cause-image part specifically selected to be able to fit within a limited size of display screens of handheld mobile wireless devices, wherein the cause-text part identifies the cause and the cause originator, and wherein the cause-text is overlaid on a portion of the cause-image;
the social community application provides for the cause-message creation by a celebrity, wherein a celebrity status of the cause originator identified in the cause server database and the cause-message is stored in the cause-server database of the cause-server and accessible over the global computer network by search and retrieval based on fields that include categories of causes, a cause identification, a cause originator identification, and a date range;
the social community application spreads the cause-message over the global computer network in response to a user sending a cause-message link in the cause-server to a list of contacts corresponding to the user, wherein the cause-message link embeds a program code that when clicked, displays the cause message; and
the social community application creates a geographic map showing the spread of the cause-message indicating locations of original mobile wireless device and locations of a first-ring and subsequent-rings of the mobile devices that have clicked the cause-message link to receive the cause-message, wherein:
a time out for the cause-message spread is declared when a rate of spread falls below a threshold, and
a total count by region is displayed and the geographic map is frozen and archived for subsequent retrieval searchable by the cause id, original mobile name and the date range.

2. The system as in claim 1, comprising:
the cause-text part identifies (i) the cause, (ii) the originator of the cause by a name/handle, and (iii) the celebrity status of the originator.

3. The system as in claim 1, comprising:
the cause-text part of the cause-message begins with a verb-part identifying the cause.

4. The system as in claim 1, comprising:
the cause-image part in the form of one of a single image, a flash animation, a video and any other image format that visually illustrates the cause.

5. The system as in claim 1, comprising:
the cause message is originated by a mobile device owner and is spread by the mobile device owner, wherein sending the cause-message link in the cause-server to the list of contacts, and wherein the list of contacts forwards the cause-message link to others in their own contact lists.

6. The system as in claim 1, comprising:
the social-community application operable in the cause-server on the global computer network, wherein the social-community application enables spread of cause-messages via the mobile wireless devices.

7. The system as in claim 6, comprising:
the social-community application enables creation of the cause-message supporting content associated with the cause-message, wherein the cause-message supporting content include from a group of, cause-originator information, cause-support data and images, dialogue/communication with others, and link(s) to similar other supporting causes in the cause-server, and wherein the social-community application enables creation and maintenance of the cause-based social community via the different parts of the cause-message and the cause-message supporting content.

8. A method of creating and sustaining cause-based social communities on a global network of computers comprising the steps of:
providing a system having a cause-server, a cause-server database, and a social community application, wherein the system operative with the social community application, and wherein the social community application provides creation of a cause-message, and wherein the cause-message has a specific multi-part structure that comprises identification of a cause via a cause-image and a cause-text message, and a cause-originator overlaid over the cause-image,
wherein the cause is associated with members of the cause-based social community, and wherein the cause-message supports creation of either an ad hoc or permanent cause-based social community, and wherein the cause-message is exclusively for causes that include at least one of, charitable, social, political, religious, and sports;
providing creating the cause-message by the system, wherein specifically selecting the cause-image to be able to fit and being sized to fit a limited display screens of handheld mobile wireless devices, and wherein the cause-text is overlaid on a portion of the cause-image, and wherein identifying by the cause-text the cause and the cause originator;
providing, by the social community application, the cause message creation in the cause server database and storing the cause message in the cause-server database making the cause message accessible over the global computer network by search and retrieval based on fields that include, categories of causes, a cause identification, a cause originator identification, and a date range;
providing, by the social community application, the cause-message creation by a celebrity, wherein a celebrity status of the cause-originator is identified in the cause server database; and providing spreading the cause message by the social community application over the global computer network in response to a user sending a cause-message link in the cause-server to a list of contacts corresponding to the user, wherein:

the cause-message link embeds a program code that when clicked, displays the cause message, a geographic map is created that shows the spread of the cause-message indicating locations of original mobile device and locations of a first-ring and subsequent-rings of the mobile wireless devices that have clicked the cause-message link to receive the cause-message, a time out for the cause-message spread is declared when a rate of spread falls below a threshold, and a total count by region is displayed and the geographic map is frozen and archived for subsequent retrieval searchable by the cause id, original mobile name and the date range.

9. The method as in claim 8, comprising the steps of:
enabling creating the cause-message in multiple parts comprising the cause-image and the cause-text; and overlaying the cause-text on a portion of the cause-image.

10. The method as in claim 9, comprising the steps of:
enabling creating the multiple parts of the cause-message, wherein the cause-text is overlaid over the cause-image, identifying the cause, the cause-originator and the celebrity status of the cause-originator.

11. The method as in claim 8, comprising the steps of:
maintaining databases in the cause-server enabling search and retrieval of the cause-messages by the others; and
downloading the cause-message to other's wireless mobile devices that have an embedded GPS function and sending the cause-message link to others by an e-mail and text messages enabling the cause-message to spread out.

12. The method as in claim 8, comprising:
enabling creating the cause-message supporting content associated with the cause-message, wherein the cause-message supporting content include from a group of, cause-originator information, cause-support data and images, dialogue/communication with other, and link (s) to similar other supporting causes in the cause-server.

13. The method as in claim 12, comprising:
enabling creating and maintaining the cause-based social community via the different parts of the cause-message and the cause-message supporting content.

14. A system for creating a cause-based social community on a global communication network, comprising:
a cause-server, a cause-server database, a wireless mobile device and, a social-community application operable in the cause-server, the social-community application has a server part and a wireless mobile device part, wherein an originating mobile device using the wireless mobile device part of the social-community application enables creation of a cause-message, and wherein the cause-message has a specific multi-part structure that comprises identification of a cause via a cause-image and a cause-text message and a cause-originator overlaid over the cause-image, and wherein the cause is associated with members of the cause-based social community, wherein the cause-message is exclusively for causes that include at least one of, charitable, social, political, religious, and sports cause, and wherein the cause-message is uploaded by the originating mobile device to the cause-server along with mobile device position from a GPS function in the originating mobile device;

the cause-server stores the cause-message with the originating mobile device GPS location and sends a cause-server link to the originating mobile device, wherein the wireless mobile device part creates a text message, embeds the cause-server link within the cause-message, and broadcasts the cause-message to a list of mobile device's contacts in the originating mobile device, enabling other mobile receivers identified on the list to receive the cause-message;

the other mobile receivers, also identified as a first-ring of mobile devices open the cause-message, choose to join or associate with the cause and click the cause-server link to load the cause-message to their own mobile devices from the cause-server along with a version of mobile application part to enable the other mobile receivers to broadcast the cause to their list of contacts;

the social-community application stores the first-ring mobile device locations in the cause-server, and sends the cause-message to respective mobile devices corresponding to the second-ring mobile devices, when the respective mobile devices corresponding to the second-ring mobile devices load the cause-message with the version of the mobile application part that repeats the broadcasts to each one's mobile contacts, thus a third set of rings, and so on are created enabling the cause-message to spread out via successive rings of mobile devices; and the social community application creates a geographic map showing the spread of the message indicating locations of the originating mobile device and locations of the first-ring and subsequent-rings of the mobile devices that have clicked the cause-server link to receive the cause-message, wherein:

a time out for the cause-message spread is declared when a rate of spread falls below a threshold, and a total count by region is displayed and the geographic map is frozen and archived for subsequent retrieval searchable by cause id, original mobile name and date range.

15. The system as in claim 14, comprising:
the social community application stores in a database, data related to the mobile device locations, the cause-message, and computations of rate and location of spread of the cause-message.

16. The system as in claim 15, comprising:
the cause-server downloads the geographic map to anyone with a display on a display screen of (i) the geographic map in the middle, (ii) the cause-message displayed on a part of the screen, (iii) a running count of cause-message spread in a bottom space, (iv) and uses other spaces of the display screen as an advertising space; and the geographic map and the display are updated periodically with an updated map and advertising space content.

17. The system as in claim 16, comprising:
the spread of the cause-message is displayed on the geographic map as clusters of light points and also be displayed as a spider chart.

18. The system as in claim 14, comprising:
the cause-message comprises a cause-text part and a cause-image part, wherein the cause-text part is overlaid over the cause-image part, creating a composite cause-message.

19. The system as in claim 18, comprising:
the cause-text part of the cause-message begins with a verb part identifying the cause.

\* \* \* \* \*

UNITED STATES PATENT AND TRADEMARK OFFICE
CERTIFICATE OF CORRECTION

| | | |
|---|---|---|
| PATENT NO. | : 11,818,090 B2 | Page 1 of 1 |
| APPLICATION NO. | : 12/932259 | |
| DATED | : November 14, 2023 | |
| INVENTOR(S) | : Tara Chand Singhal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this
First Day of July, 2025

Coke Morgan Stewart
*Acting Director of the United States Patent and Trademark Office*